Nov. 1, 1932.  A. M. B. CHARLIN ET AL  1,885,989
DEVICE REPRODUCING THE SOUNDS RECORDED ON A TALKING CINEMATOGRAPHIC FILM
Filed April 21, 1931  4 Sheets-Sheet 1
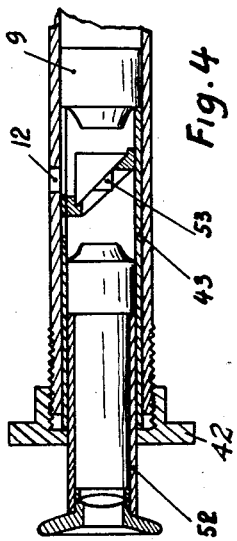
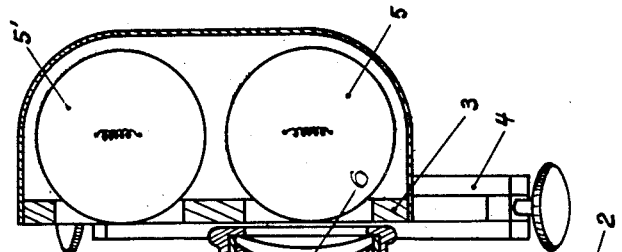
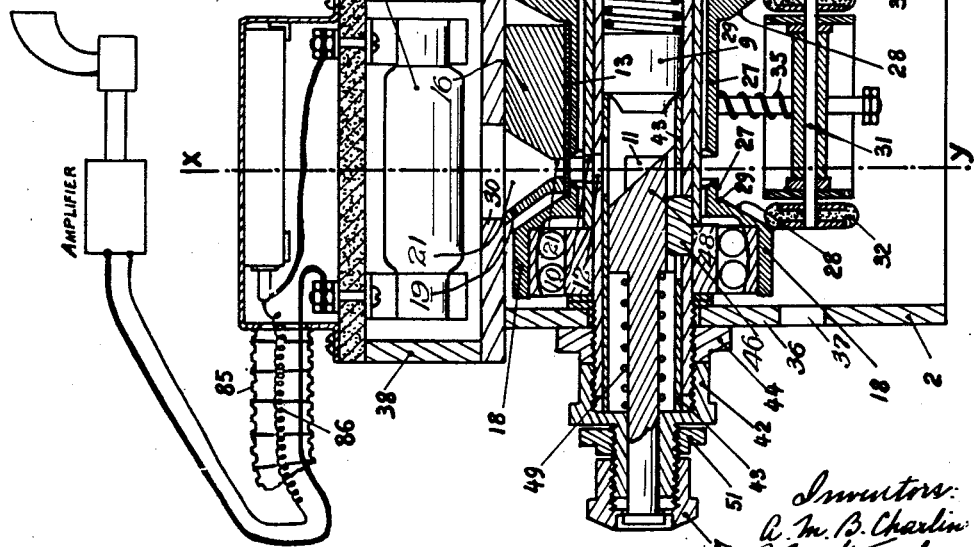

Nov. 1, 1932.  A. M. B. CHARLIN ET AL  1,885,989
DEVICE REPRODUCING THE SOUNDS RECORDED ON A TALKING CINEMATOGRAPHIC FILM
Filed April 21, 1931  4 Sheets-Sheet 2

Nov. 1, 1932.  A. M. B. CHARLIN ET AL  1,885,989
DEVICE REPRODUCING THE SOUNDS RECORDED ON A TALKING CINEMATOGRAPHIC FILM
Filed April 21, 1931    4 Sheets-Sheet 4
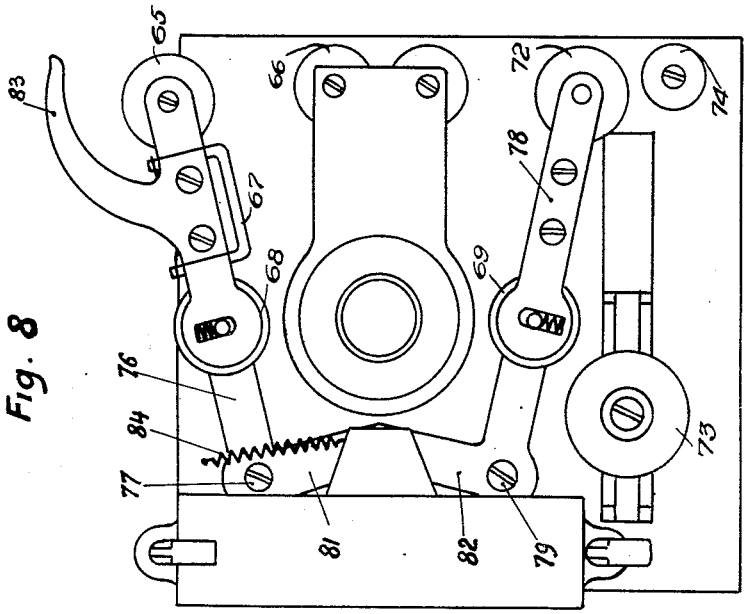
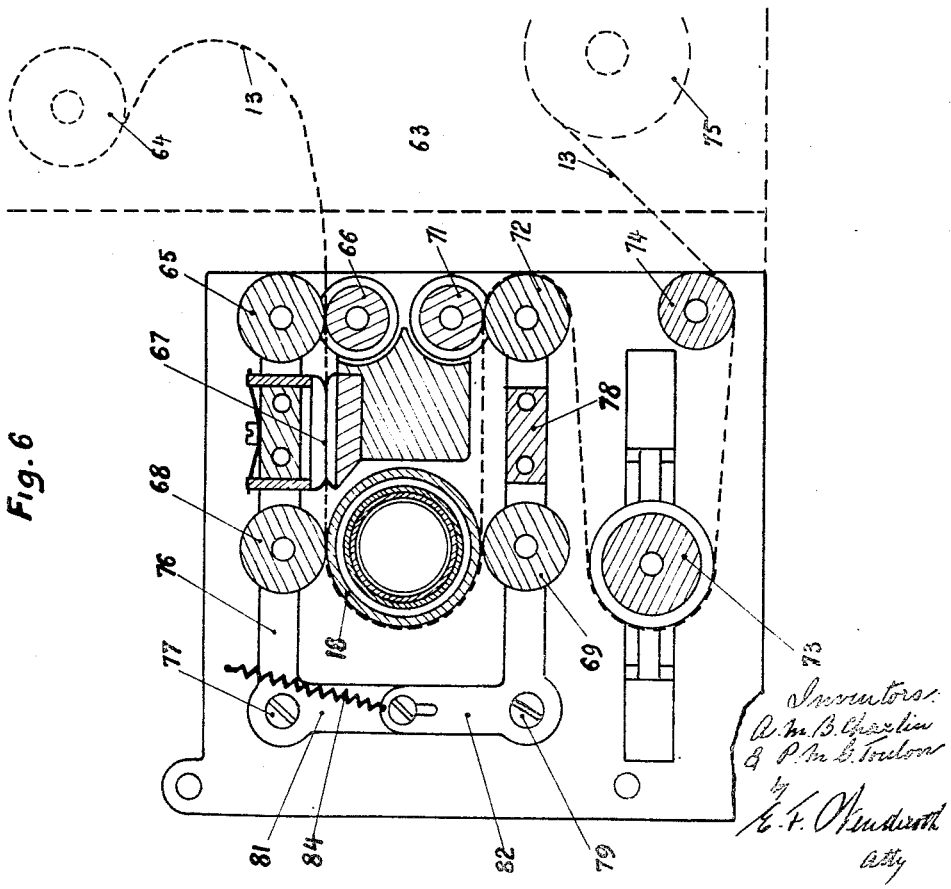

Patented Nov. 1, 1932

1,885,989

UNITED STATES PATENT OFFICE

ANDRÉ MARIE BERNARD CHARLIN, OF MONTROUGE, AND PIERRE MARIE GABRIEL TOULON, OF PUTEAUX, FRANCE

DEVICE REPRODUCING THE SOUNDS RECORDED ON A TALKING CINEMATOGRAPHIC FILM

Application filed April 21, 1931, Serial No. 531,774, and in France April 28, 1930.

In talking cinematographic films, the sounds are generally recorded on a narrow strip on the side of the photographic pictures which are to be projected on the screen. Said sound record is sometimes of variable transparency, sometimes formed of two parts, an opaque one and a transparent one, of variable width. In both cases, a luminous beam is caused to pass through said sound record and has its intensity modulated either by the variations of transparency of said sound record or by the variations of width the transparent part thereof. Said beam is directed onto a photo-electric cell so as to modulate the intensity of the current flowing therethough, and said current, conveniently amplified, operates suitable loud speakers.

Generally, the photoelectric cell and the optical devices which concentrate the light beam thereon, after said beam has passed through the film, are part of the cinematographic apparatus; in most cases, the cell is difficult to accede to and the focussing of the optical devices rather uneasy. On the other hand, the speed of the film in front of the luminous beam does not remain quite uniform and, consequently, variations in the pitch of the reproduced sounds producing most disagreeable effect may occur during the performance.

The primary object of our invention is to provide a sound reproducing apparatus avoiding these drawbacks, occupying but little space, and adapted to be attached to any ordinary cinematographic apparatus without requiring any change therein.

Another object of our invention is to provide an apparatus of that kind with special devices for ensuring a uniform speed of the film and preventing any lateral displacement thereof.

With the arrangement according to our invention, the film, after having passed before the projector, passes through the sound reproducing apparatus and, upon issuing therefrom, is wound up on the take up reel of the cinematographic apparatus, the movement of the film through the sound reproducing device being produced merely by the traction exerted thereon by said reel; its speed is controlled and made uniform either by a fly-wheel or by a regulator of any kind, say a centrifugal one, controlling the speed of the driving motor of the cinematographic apparatus.

The device according to our invention is chiefly characterized by the fact that all of the parts are supported by a tube fixed to a support at one of its ends, said tube being overhung and supporting the devices for guiding the film and the photoelectric cell.

The luminous beam travels along the axis of the tube and is deflected at right angle in order to pass through an aperture provided in the tube wall, through the recorded portion of the film, and finally to fall on the photoelectric cell. Special devices allow the film to be easily inserted into or removed from the apparatus.

The following description and the annexed drawings will disclose several embodiments of our invention:

Figure 1 is a cross-section of the apparatus through a plan passing by the axis of the tube;

Figure 4 is a modification of the apparatus provided with an eye glass for controlling the luminous beam;

Figures 5, 6, 7 show a modification in which the speed is regulated by a centrifugal governor controlling electrically the driving motor;

Figure 8 shows how the apparatus can be opened in order to place or remove the film.

Figure 2:
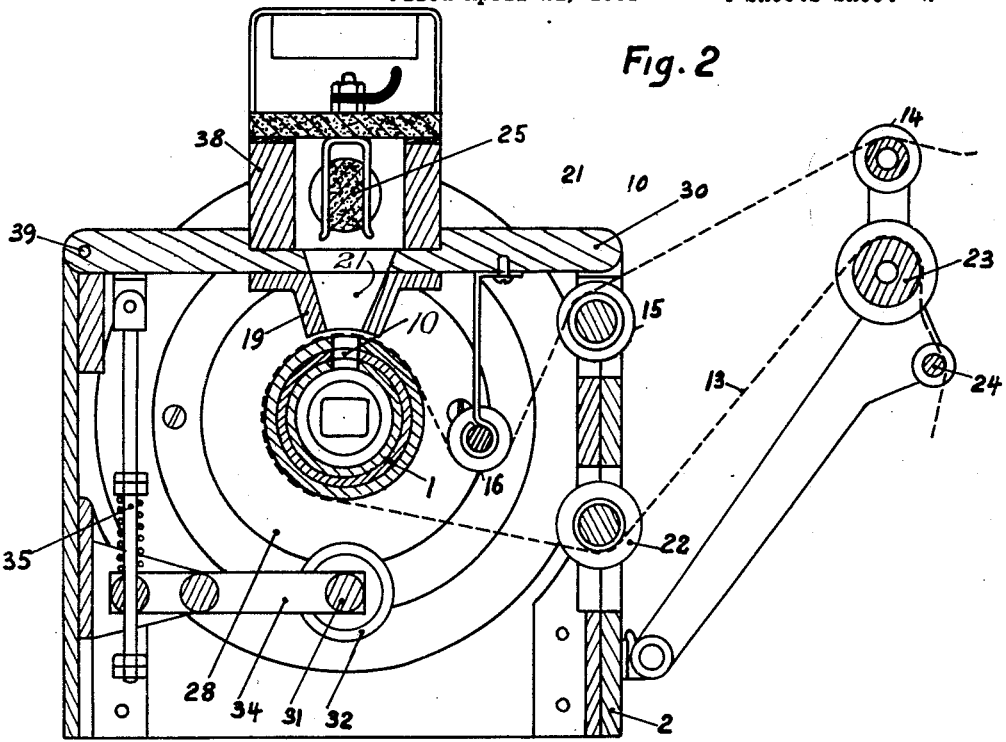
Figure 2 is a cross-section by the plan $xy$ perpendicular to said axis.

The apparatus comprises an overhung tube 1, the right hand extremity of which is secured in a support 2. A plate 3, adapted to slide in a guide 4, and provided with lamps 5 and 5', is secured to the right hand extremity of tube 1. By moving said plate, one or the other of said lamps may be brought just opposite the opening of the tube. This arrangement serves to reduce the length of the interruptions which might result from one accident to one of the lamps;

In front of said lamp, inside the tube, are placed lenses 6 for concentrating the light upon a narrow slit 7 provided in a screen 8. The light beam issuing from said slit passes through an objective 9 which produces a reduced image of the said slit. A prism 11 deflects the light beam at right angles so as to cause it to pass through an aperture 12 provided in the wall of tube 1, so that the reduced image of slit 7 may be formed exactly on the film 13.

The film, coming with a discontinuous motion from the projector, runs over rollers 14, 15, 16 (Fig. 2) then over rollers 17 and 18 (Fig. 1) against which it is pressed by a piece 19 provided with an aperture 21 so disposed as to register with aperture 12 of tube 1. The film, after passing over rollers 17 and 18, is led by rollers 22, 23, 24, to the take up reel of the cinematographic apparatus, on which it is wound up. As above stated, the film is driven through the sound reproducing apparatus merely by the traction exerted by the take up reel, so that said reproducing apparatus requires no special motor.

Rollers 17 and 18 can rotate on ball bearings around tube 1, and are separated by an annular gap 10 located just opposite apertures 12 and 21, things being so disposed that the recorded portion of the film runs in exact register with said gap. The luminous beam can thus pass through said gap, and then fall, with an intensity modulated by said film, on the photoelectric cell 25.

In order to make uniform the speed of the film, roller 17 is fastened to a fly-wheel 26, heavy enough to prevent sudden variations in said speed.

To prevent also any lateral displacement of the film upon rollers 17 and 18, said rollers are formed with a cylindrical part 27 which carries the film, and a frustoconical part 28 joined thereto by a shoulder 29.

The axis of the roller 17, secured to the fly-wheel 26, is always coinciding with the axis of tube 1, but roller 18 rotates on a ball bearing disposed in such a manner that said roller is adapted to oscillate angularly with respect to said tube. A movable shaft 31 supports at both ends two small wheels 32 bearing upon the frustoconical parts of rollers 17 and 18 respectively. Said shaft is supported by an oscillating lever 34 (Fig. 2) subjected to the action of a spring 35, so as to apply wheels 32 against rollers 17 and 18. Under these conditions it is obvious that the axis of roller 18 shall make a small angle with the axis of tube 1 so that film 13 shall be firmly held between the shoulders 29 of the two rollers. Consequently, the film cannot move laterally and the sound record runs exactly in register with apertures 12 and 21 through which the luminous beam passes.

Figure 3:
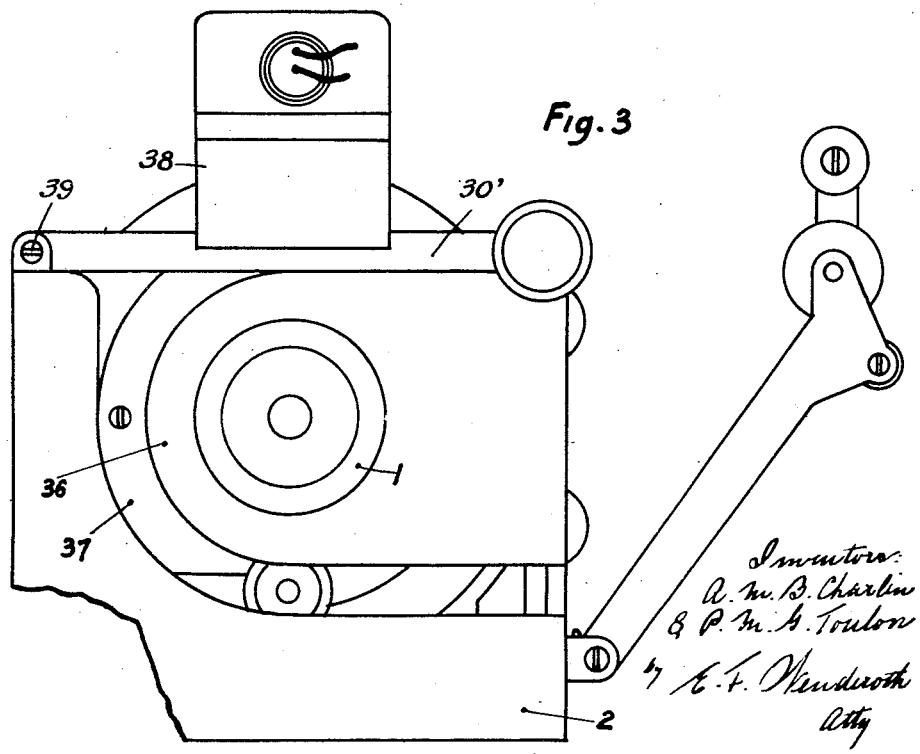
Figure 3 is a front-view of the apparatus.

In an apparatus of this kind, it is necessary that the film should be put in place or removed quickly; this is made easy by the overhanging position of the tube. Support 2 has the shape of a box, in order to surround and protect the above described devices, but its front face (Figure 3) is so shaped that it leaves between itself and a plate secured to the tube a space 37 through which it is possible to pass the loop formed by the film.

The photoelectric cell 25 is enclosed in a box 38 secured to a plate 30 which supports also piece 19 and is hinged at 39. When said plate is turned around its hinge 39, the upper part of the rollers 17 and 18 is cleared, but at the same time the connecting rod 35 actuates the lever 34 and thus moves wheels 32 away from rollers 17 and 18. It is then easy to slip the loop of film through gap 37 so as to put it in place or remove it.

The disposition of the cell also makes it possible to easily examine it or to put a new one in place if necessary. Furthermore, it is advantageous, for an exact reproduction of the sounds, that the beam falling on the film be as narrow as possible, and consequently the image of slit 7 should be formed exactly on the film. In order to obtain such a result, we have provided adjusting means easy to operate.

In Fig. 1, we have shown a device in which such a focussing is obtained by adjusting the position of objective 9. Displacement of said objective is obtained by rotating nut 42 which pushes cylinder 43 into tube 1. Objective 9 itself is applied against the cylinder 43 by a spring 45, and a stud 46, projecting into a slot made in the wall of tube 1, prevents it from rotating; a lock nut 44 keeps nut 42 in position when the focussing is right.

It is also possible to move prism 11 by rotating the knob 47 which actuates the support 48 of said prism and compresses or releases the spring 49, a safety nut 51 keeping said knob in position when the adjustment is made.

According to another embodiment of our invention, we fix prism 11 to tube 1, for instance by means of supports extending throughout slots provided in cylinder 43, and in that case, we focus only objective 9, as above explained; in such a case, we may, in place of the adjustment device of the prism 11, provide, as shown on Figure 4, an eye glass 52 and examine therethrough the image of slit 7; a little prism 53 is then added to prism 11 in order to add a part of the luminous beam to run straightforward and reach the eye glass.

Figure 5:
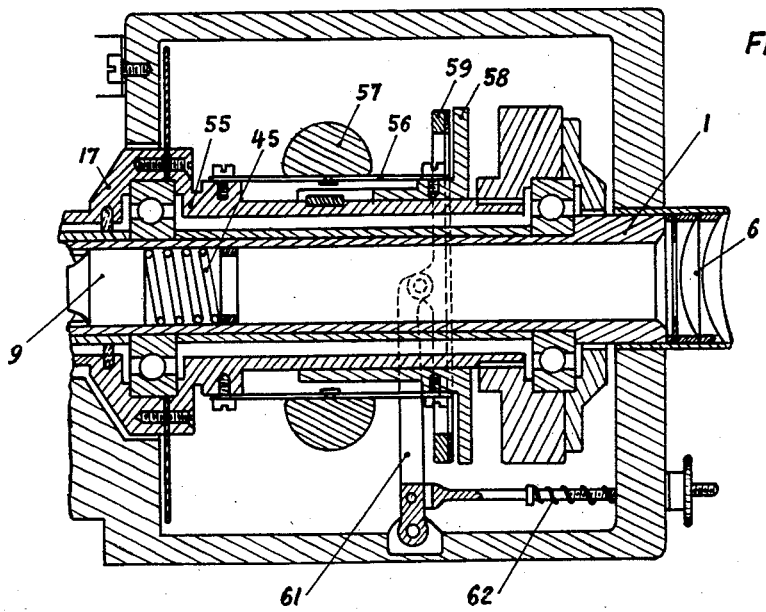

Fig. 5 shows a modification of the device for regulating the angular speed of the roller 17, said roller being no longer secured to a fly-wheel, but to a centrifugal governor such as those commonly used in talking machines.

Said governor is mounted on a cylinder 55 fastened to the roller 17, supported by ball-bearings and adapted to rotate about tube 1. Flexible rods 56 carrying heavy lead ball 57 are fastened at one end to said cylinder 55 and at the other end to a ring 58 slidably mounted upon said cylinder; if the speed of revolution increases, it is obvious that said ring 58 moves towards the left hand side and then, rubbing against stationary ring 59, works like a brake.

Ring 59 is supported by a fork 61 which can be displaced by the screw 62; the speed of revolution can thus be regulated in the same manner as in talking machines.

The speed of revolution of roller 17 and consequently that of film 13 being so made uniform, we synchronize therewith the speed of revolution of the motor driving the cinematographic apparatus, and, as explained above, serves to drive the film. For that purpose, the film, between the output end of the reproducing apparatus and the driving device of the cinematographic apparatus, is allowed to make a loop whose length varies according to the difference between the speeds of said driving devices and that of roller 17, the speed of the driving motor being controlled according to the length of said loop.

Figure 7:
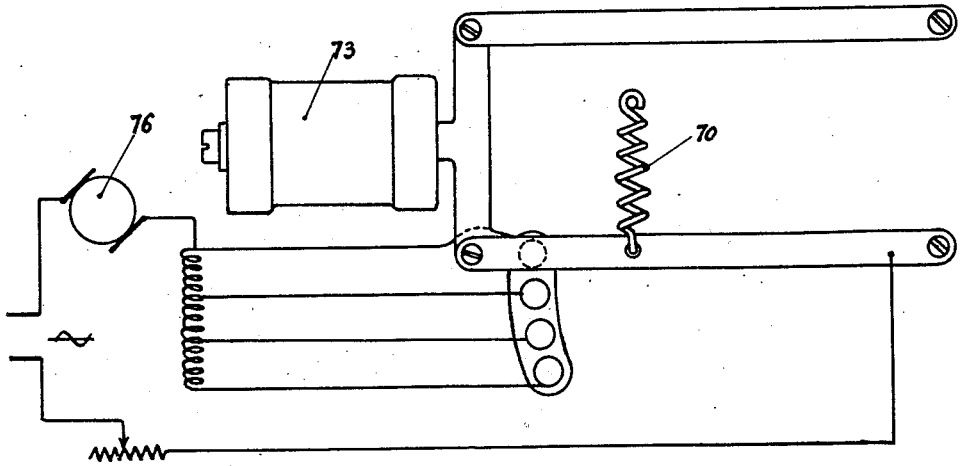

Figs. 6 and 7 show an embodiment of our invention.

The film leaves the cinematographic apparatus 63 with a discontinuous movement given thereto by maltese cross 64; it then travels between rollers 65, 66 then between surfaces 67, which act like a brake and give the necessary tensioning to the film. Said film is applied against roller 17 by rollers 68 and 69, after which it passes between rollers 71 and 72 and around roller 73. Said roller 73 can be displaced horizontally, for instance it is supported by a jointed parallelogram as shown in Figure 7. A spring 70 is so arranged that it tensions the loop formed by the film between the rollers 71 and 72 and the driving device, such as sprocket 75. The film may also be supported by the roller 74.

The operation of our device is then easily understood. If the speed of driving motor 76 (Figure 7) and consequently of sprocket 75, increases and becomes greater than the constant speed of revolution of roller 17, it is obvious that the length of the loop formed by the film shall decrease and thus, roller 73 shall be moved towards the right hand side of Figure 6, but the displacement of said roller 73 controls the speed of revolution of the driving motor 76, for instance, as shown on Figure 7, by varying the number of exciting turns, or through any other means, and its displacement towards the right shall have for its effect to decrease the speed of revolution of motor 76. It is obvious that, if the speed of the motor becomes less than that of the roller, the displacement of the roller 73 shall be in the opposite direction and its effect shall be to increase the speed of motor 76.

In order to allow the ready insertion and removal of the film, rollers 65 and 68, as ported by a lever 76 pivoted at 77. Rollers 69 and 72 are supported by the lever 78 pivoted at 79; these two levers are connected by arms 81 and 82; thus, if, as shown on Figure 8, lever 76 is lifted up by the intermediary of finger 83, lever 78 is simultaneously pulled down and consequently roller 17 is cleared and the film can be put in place or removed without difficulties.

Finally it is endly necessary to prevent the wires connecting the cell 25 with the amplifiers to take any relative movement with reference to each other, because that should vary the electrostatic capacity and spoil the reproduction of the sound. To avoid said drawbacks, the wires are disposed in a flexible metallic tube 85, one of said wires 86 consisting of an helicoidal spring fastened at both ends, and supported by rings of an insulating material, such as pasteboard. The other wire, insulated as usual by means of india-rubber or a like material, is laid directly on the wall of the tube 85.

What we claim is:—

1. A sound reproducing apparatus of the type and described for film records cooperating with a cinematographic apparatus, comprising in combination, a support, a tube fixed at one end to said support, and provided with an aperture in its wall, two rotary rollers for guiding the film around said tube, concentrically journalled on said tube and leaving between them an annular gap registering with the aperture of the tube, means for projecting a light beam through said tube from the fixed end thereof, means for deflecting the beam through said aperture in the tube and said annular gap, photoelectric means disposed in the path of travel of said beam after its passage through the film for transforming the luminous variations into sounds, means for causing the rotation speed of one of the rollers to remain constant, and means for adjusting, according to said speed, the speed of the motor of the cinematographic apparatus.

2. A sound reproducing apparatus according to claim 1, comprising in combination a source of light located opposite the fixed end of the tube, a screen provided with a slit disposed inside said tube, optical means for concentrating the light rays from said source on said slit, an object glass for producing a reduced image of said slit, a tubular member sliding within the tube and supporting said object glass, a spring for opposing the inward displacement of said member, a screwed knob located outside the tube for actuating said member in order to focus the image of the slit on the film, a prism for deflecting the light beam from the object glass through the aperture of the tube and prism, a screwed knob for actuating said stem, a photoelectric cell disposed in the path of the travel of the light beam, means for connecting said cell with an amplifier and a loud speaker for transforming the luminous variations into sounds.

3. A sound reproducing apparatus according to claim 1, in which the means for ensuring a uniform rotation of the film guiding roller consist of a fly-wheel rigidly connected to one of said rollers.

4. A sound reproducing apparatus according to claim 1, in which the means for ensuring a uniform rotation of the film guiding roller consist in a brake, a centrifugal governor connected to one of said rollers for controlling said brake and means for adjusting the brake.

5. A sound reproducing apparatus according to claim 1, comprising in combination two film guiding rollers having each a frusto-conical part, one of said rollers being so disposed that its longitudinal axis can make a certain angle with the axis of the tube; an arm pivotally supported with respect to said tube, a shaft journalled in said arm, a wheel at either end of said shaft adapted to engage with the frusto-conical parts of said rollers, a photoelectric cell disposed to receive the light beam after its passage through the film, a support for said electric cell pivotally fixed on the tube, means connecting said support to said arm for moving them simultaneously away from the rollers.

6. A sound reproducing apparatus according to claim 1 in which the film, after having been guided by the rollers forms a loop, comprising in combination a movable roller around which passes said loop, a spring pulling said roller in such a direction that it tensions said loop, means responsive to the position of said roller for controlling the speed of the motor of the cinematographic apparatus.

In testimony whereof we have signed our names to this specification.

PIERRE MARIE GABRIEL TOULON.
ANDRÉ MARIE BERNARD CHARLIN.